(12) United States Patent
De Mello et al.

(10) Patent No.: US 8,560,853 B2
(45) Date of Patent: Oct. 15, 2013

(54) DIGITAL SIGNING POLICY

(75) Inventors: Marcio De Mello, Bellevue, WA (US); Mahmood A. Dhalla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 11/223,255

(22) Filed: Sep. 9, 2005

(65) Prior Publication Data

US 2007/0061579 A1    Mar. 15, 2007

(51) Int. Cl.
*G06F 21/00*    (2013.01)

(52) U.S. Cl.
USPC ............ 713/176; 713/182; 713/193; 713/181

(58) Field of Classification Search
USPC ............ 713/176, 177, 182; 700/182; 715/964
See application file for complete search history.

(56) References Cited

U.S. PATENT DOCUMENTS

| | | | | |
|---|---|---|---|---|
| 5,661,805 A * | 8/1997 | Miyauchi | | 713/176 |
| 5,673,316 A * | 9/1997 | Auerbach et al. | | 705/51 |
| 6,021,202 A * | 2/2000 | Anderson et al. | | 705/54 |
| 6,199,049 B1 * | 3/2001 | Conde et al. | | 705/24 |
| 6,209,095 B1 * | 3/2001 | Anderson et al. | | 713/176 |
| 6,321,339 B1 | 11/2001 | French et al. | | |
| 6,430,608 B1 * | 8/2002 | Shaio | | 709/217 |
| 6,609,200 B2 * | 8/2003 | Anderson et al. | | 713/176 |
| 6,862,696 B1 | 3/2005 | Voas et al. | | |
| 7,299,408 B1 * | 11/2007 | Daconta et al. | | 715/234 |
| 7,353,397 B1 * | 4/2008 | Herbach | | 713/176 |
| 7,512,814 B2 * | 3/2009 | Chen et al. | | 713/193 |
| 7,861,086 B2 * | 12/2010 | Ohta | | 713/176 |
| 7,900,050 B2 * | 3/2011 | Izu et al. | | 713/176 |
| 8,091,015 B2 * | 1/2012 | Yoshioka et al. | | 715/201 |
| 2001/0018739 A1 * | 8/2001 | Anderson et al. | | 713/176 |
| 2002/0023220 A1 | 2/2002 | Kaplan | | |
| 2002/0040431 A1 * | 4/2002 | Kato et al. | | 713/168 |
| 2002/0099938 A1 * | 7/2002 | Spitz | | 713/155 |
| 2002/0138735 A1 * | 9/2002 | Felt et al. | | 713/176 |
| 2003/0097558 A1 * | 5/2003 | England et al. | | 713/155 |
| 2003/0097578 A1 * | 5/2003 | England et al. | | 713/191 |
| 2003/0105950 A1 | 6/2003 | Hirano et al. | | |
| 2003/0126464 A1 | 7/2003 | McDaniel et al. | | |

(Continued)

FOREIGN PATENT DOCUMENTS

CN    1536871 A    10/2004
JP    2291043    11/1990

(Continued)

OTHER PUBLICATIONS

B. Watson. "A First Look at APIs for Creating XML Paper Specification Documents". MSDN magazine. Jan. 2006. Available at http://msdn.microsoft.com/en-us/magazine/cc163664.aspx. Downloaded Feb. 10, 2009.*

(Continued)

*Primary Examiner* — David García Cervetti
(74) *Attorney, Agent, or Firm* — Lee & Hayes, PLLC

(57) ABSTRACT

Techniques relating to directed digital signing policy are described. In one instance, a system includes means for storing a document as a plurality of logical parts. The system also includes means for establishing a document configuration when a digital signature is applied to the document, and means for indicating whether the document configuration is subsequently altered.

19 Claims, 8 Drawing Sheets

(56) References Cited

U.S. PATENT DOCUMENTS

| | | | |
|---|---|---|---|
| 2003/0145197 A1* | 7/2003 | Lee et al. | 713/155 |
| 2003/0217275 A1* | 11/2003 | Bentley et al. | 713/184 |
| 2004/0148508 A1* | 7/2004 | Alev et al. | 713/180 |
| 2004/0168064 A1* | 8/2004 | Shimizu et al. | 713/176 |
| 2005/0050516 A1* | 3/2005 | Mysore | 717/114 |
| 2005/0132201 A1* | 6/2005 | Pitman et al. | 713/176 |
| 2005/0172131 A1* | 8/2005 | Nakayama et al. | 713/176 |
| 2005/0289351 A1* | 12/2005 | England et al. | 713/180 |
| 2006/0005230 A1* | 1/2006 | England et al. | 726/1 |
| 2006/0031677 A1* | 2/2006 | Ohta | 713/176 |
| 2006/0048127 A1* | 3/2006 | Smith et al. | 717/162 |
| 2006/0101285 A1* | 5/2006 | Chen et al. | 713/193 |
| 2006/0130127 A1* | 6/2006 | Kaler et al. | 726/7 |
| 2006/0168650 A1* | 7/2006 | Kumagai et al. | 726/5 |
| 2006/0174103 A1* | 8/2006 | Verma et al. | 713/151 |
| 2006/0265689 A1* | 11/2006 | Kuznetsov et al. | 717/117 |
| 2007/0277245 A1* | 11/2007 | Goto et al. | 726/27 |

FOREIGN PATENT DOCUMENTS

| | | |
|---|---|---|
| JP | 1040100 | 2/1998 |
| JP | 2004537094 | 12/2004 |
| JP | 2005051734 | 2/2005 |
| JP | 2005182546 | 7/2005 |
| KR | 100187876 | 8/1999 |
| KR | 1020030019398 | 3/2003 |

OTHER PUBLICATIONS

Parametric Technology Corporation, "Getting Started with Pro/ENGINEER(R) 2001", Parametric Technology Corporation, pp. 1-192.*

"IEEE 100 The Authoritative Dictionary of IEEE Standards Terms Seventh Edition," IEEE Std 100-2000, vol., No., pp.-, 2000, p. 308.*

Foreign Search Report dated Feb. 20, 2007, relating to Application No. PCT/US2006/034581.

The Chinese Office Action mailed Sep. 1, 2011 for Chinese patent application No. 200680033092.7, a counterpart foreign application of U.S. Appl. No. 11/223,255, 6 pages.

Translated Chinese Office Action mailed Dec. 21, 2010 for Chinese Patent Application No. 200680033092.7, a counterpart foreign application of U.S. Appl. No. 11/223,255.

The Extended European Search Report mailed Aug. 1, 2012 for Euroepan patent application No. 06814178.7, 7 pages.

Translated Japanese Office Action mailed Aug. 8, 2012 for Japanese patent application No. 2008-530138, a counterpart foreign application of U.S. Appl. No. 11/223,255, 11 pages.

Kitano, et al., "An Information Hiding System for Word 2003 XML Documents", Information Processing Society of Japan, Jul. 21, 2005, vol. 2005, No. 70, pp. 205-212.

McLaughlin, "Java & XML", Japan, May 25, 2002, pp. 539-540.

The Chinese Office Action mailed Feb. 27, 2012 for Chinese patent application No. 200680033092.7, a counterpart foreign application of U.S. Appl. No. 11/223,255, 6 pages.

Translated Korean Office Action mailed Feb. 4, 2013 for Korean patent application No. 10-2008-7005709, a counterpart foreign application of U.S. Appl. No. 11/223,255, 7 pages.

Translated Japanese Office Action mailed Apr. 15, 2013 for Japanese patent application No. 2008-530138, a counterpart foreign application of U.S. Appl. No. 11/223,255, 6 pages.

Translated Japanese Office Action mailed Mar. 30, 2012 for Japanese patent application No. 2008-530138, a counterpart foreign application of U.S. Appl. No. 11/223,255, 8 pages.

"XML Paper Specification (XPS)—Windows Vista (Longhorn)", Jul. 30, 2005, retrieved at <<http://www.ailight.jp/Blog/sha256/archive/2005/7/30/XML%20Paper%20Specification%20(XPS)%20-%20Window%20Vista%20(Longhorn)>>, 2 pages.

Dunietz, "XML Paper Specification", Aug. 2005, retrieved at <<http://channel19.msdn.com/Blogs/scobleizer/Jerry-Dunietz-XML-Paper-Specification>>, 2 pages.

* cited by examiner

DIGITAL SIGNING POLICY

BACKGROUND

Adoption of paperless technologies has been hampered by many users' reluctance to utilize digital signatures to sign documents. Many of these users are confused as to what a digital signature of a document actually means. Users also perceive a lack of control over the signed document once the document leaves the user's direct control. For instance, a nefarious third party may manipulate the document while the document bears the user's digital signature. As a result digital documents are often printed and then signed in a customary pen and ink manner. At that point, whether the document is scanned or handled as a hardcopy, many of the potential advantages are lost.

SUMMARY

Techniques relating to directed digital signing policy are described. In one instance, a system includes means for storing a document as a plurality of logical parts. The system also includes means for establishing a document configuration when a digital signature is applied to the document, and means for indicating whether the document configuration is subsequently altered.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION

Overview

The described techniques relate to a digital signing policy for maintaining an electronic document as digitally signed. For instance, a publishing user may compose a document and decide to digitally sign the document when he or she is satisfied with its configuration. The digital signing policy functions at the underlying data level to establish which parts of the document to encompass with the digital signature to maintain the document in the configuration signed by the user. When a digital signature is applied in accordance with the digital signing policy, any subsequent manipulation of the document which violates the policy invalidates the digital signature. Accordingly, the continued presence of the digital signature stands as evidence that the document has not been altered since it was digitally signed. Thus, the digital signing policy facilitates a higher level of certainty about the contents of a signed document, i.e. does the document have the same configuration that it had at the time the digital signature was applied or not. This increased level of certainty relating to the document configuration can contribute to increased productivity in scenarios as diverse as contract negotiations and collaborative document composition.

The described signing policy is utilized with document packages and/or document types which store a document's data within discrete logical entities or parts. One example of such a configuration is a tree structure that has an identifiable root part and associated parts for valid processing of the root part. In such a configuration some parts store data related to content while other parts, such as the root part, store data conveying inter-relationships of other parts. For instance, one part may relate to content of a given page while another part may relate to a position of the given page relative to other pages. In this light, the digital signing policy specifies which underlying parts of a document or package are to be encompassed in order for the document configuration presented to the user to be maintained. Stated another way, the digital signing policy functions to effectively record a configuration of the document at the time that the document was digitally signed so that the configuration can be utilized to detect subsequent changes to the document. The digital signing policy can detect such changes and responsively invalidate the user's signature. At least some implementations further allow the user to specify which other parts of the document can be altered by a future user and in what manner. For instance, a publishing user, when signing the document, may specify that a consuming user can, for example, add annotations to the document without invalidating the publishing user's signature.

Exemplary Systems

Figure 1:
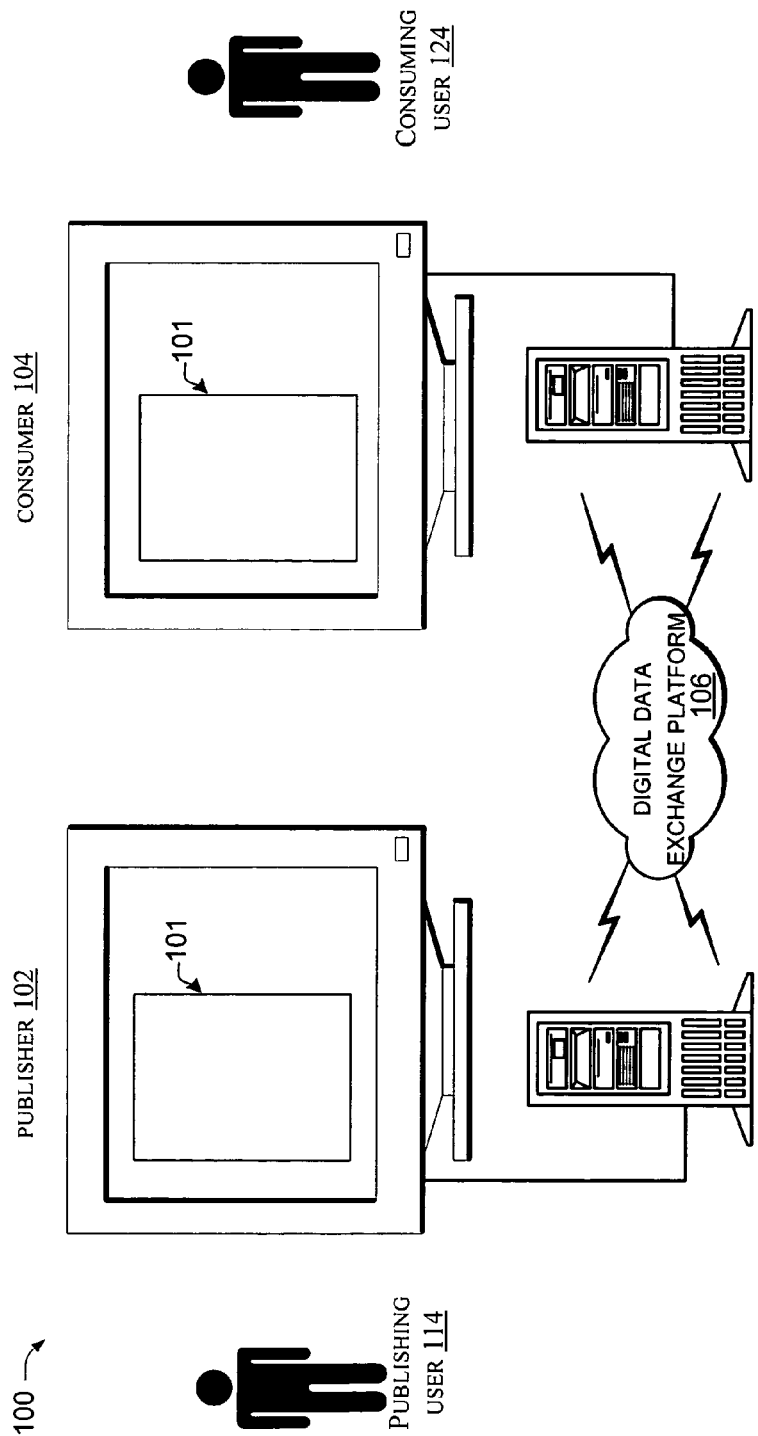
FIG. 1 illustrates an exemplary system upon which digital signing policy can be embodied in accordance with one implementation.

FIG. 1 shows an exemplary system 100 configured to implement signing policies for determining whether an electronic document 101 remains consistent with a configuration of the document when it was digitally signed. System 100 includes a publisher 102 coupled to a consumer 104 via a digital data exchange platform 106. The digital data exchange platform can include any means for transferring the digital data. For instance, various types of networks can be utilized to transfer the electronic document 101. In another example, the electronic document can be stored on some type of storage media, such as a disk or a flash device, and physically handed from one person to another. In this instance, publisher 102 includes programs or software operating on a physical computing device to create a user-interface for a publishing user 114. Similarly, consumer 104 includes programs or software operating on a physical computing device to create a user-interface for a consuming user 124.

System 100 is configured to allow publishing user 114 to interact with publisher 102 to generate document 101 which can be subsequently presented to consuming user 124. At some point during the document composition process the publishing user may achieve a document configuration that the publishing user desires to digitally sign. The digital signing policy operating on the publisher 102 specifies which underlying document parts are encompassed by the publishing user's digital signature sufficient to maintain the configuration of the document 101. The consuming user 124 can subsequently access document 101. Consumer 104 opens document 101 and examines the document in accordance with the digital signing policy. In an instance where the publishing user's digital signature remains valid, the presence of the valid signature assures the consuming user that the document remains consistent with the publishing user's intended configuration. In an instance where the digital signature has been invalidated the consuming user can act accordingly based upon the knowledge that the document has been altered. Similarly, if the document is subsequently returned to the publishing user the publisher can assess whether the publishing user's digital signature is still valid. The publishing user can then act accordingly knowing whether the document has been altered or not.

Figure 2:
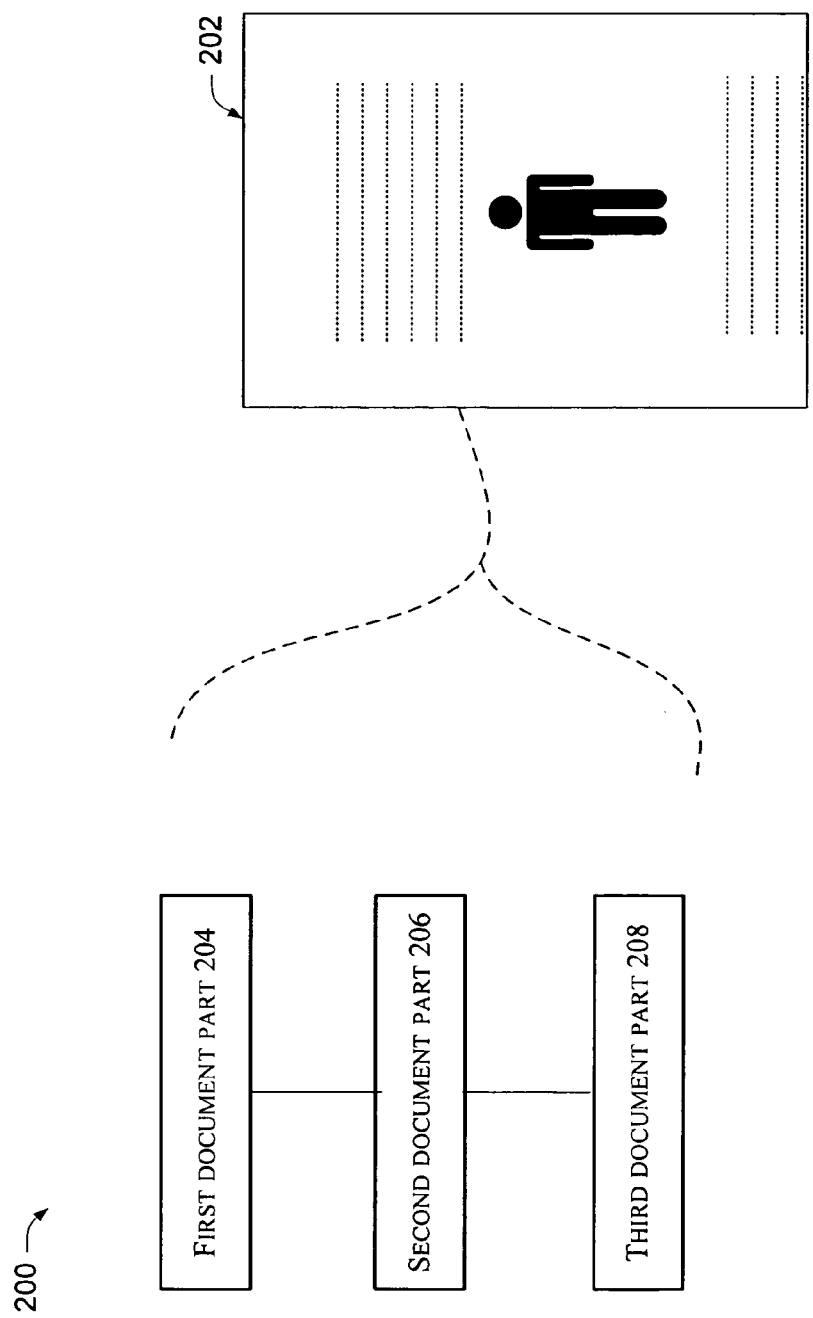
FIGS. 2-6 illustrate exemplary document configurations in which digital signing policy can be embodied in accordance with one implementation.

FIG. 2 illustrates a general example of an exemplary document format 200 upon which digital signing policy can be implemented in accordance with one implementation. In this instance, document format 200 stores data in a plurality of discrete logical parts. When parsed by a publisher or consumer the logical parts collectively create the document's configuration as presented to a user as indicated generally at 202. The document may include text, images and/or any other customary document content. In this instance, the logical parts are exemplified as a first document part 204, a second document part 206, and a third document part 208. Of course, beyond this example, other exemplary document formats may organize the logical parts in a different manner. For instance, an example of a tree type organization of logical parts is described below.

Consider for purposes of explanation a scenario where the author or publishing user desires to apply his/her digital signature to document 202 in its present form or configuration. The digital signing policy specifies which parts of the document are encompassed by the digital signature to establish the present configuration. For instance, assume that in this example the digital signing policy encompasses all three document parts 204, 206, and 208 with the digital signature. Any subsequent alteration of any of the specified parts causes the publishing user's digital signature to be invalidated. Accordingly, a valid digital signature indicates that the document exists in the configuration in which it was signed. In some implementations the digital signing policy may allow the publishing user to specify additional data which can be added to the document without invalidating their digital signature. Examples of such implementations are described below in relation to FIG. 4. Alternatively or additionally, in some implementations the digital signing policy defines a reduced or minimum number of document parts which need to be encompassed by a digital signature to ensure that the document's configuration is not altered without invalidating the signing user's digital signature.

Figure 3:
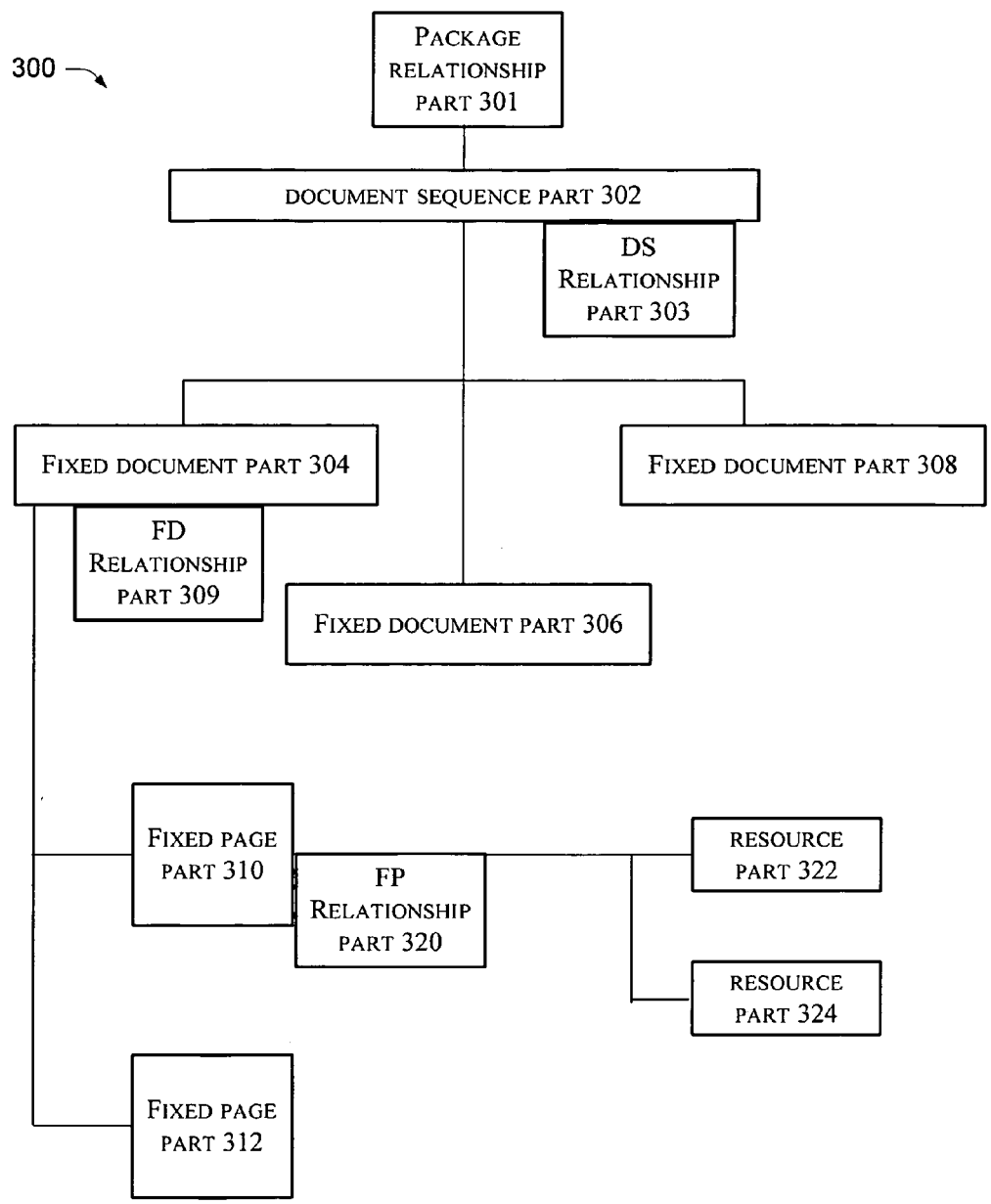
Figure 4:
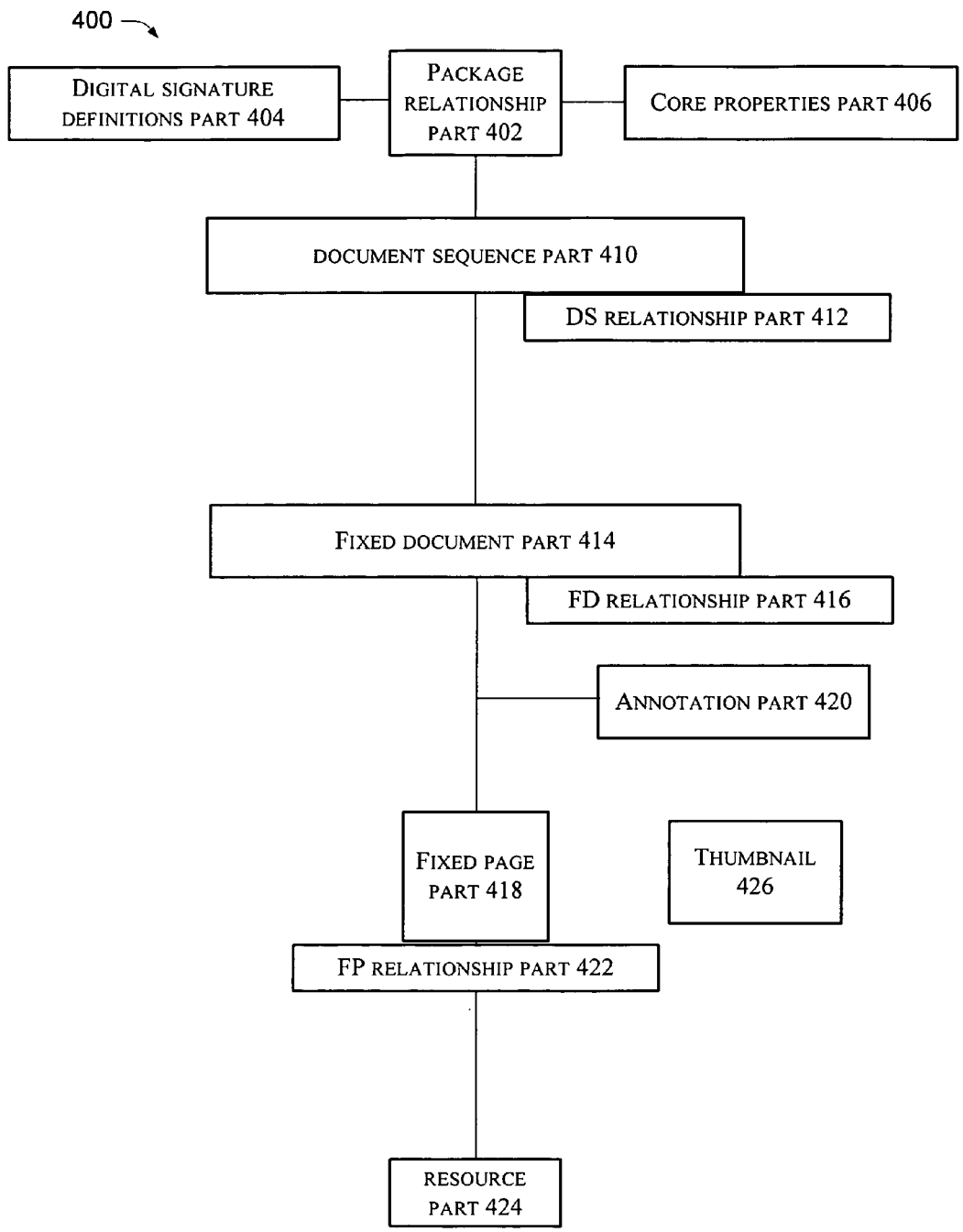

FIGS. 3-4 illustrate documents which are illustrative of a document format upon which digital signing policy can be implemented in accordance with one embodiment. One such document format upon which these documents can be implemented is a XML Paper Specification (XPS) document format, developed by Microsoft Corporation of Redmond Wash. Details regarding the XPS document format are publicly available at least at the Microsoft corporate website.

In this particular example, the digital signing policy specifies which document parts are to be encompassed by a digital signature for the document to be considered signed. If the digital signature encompasses less than the specified document parts, the document may be subsequently altered without invalidating the digital signature and as such create ambiguity about the configuration of the document at the time that the digital signature was applied. Stated another way, the function of the digital signing policy is to designate which parts are encompassed by a digital signature to effectively create a snapshot of the document configuration at the time of signing. FIGS. 3-4 provide specific examples of how the digital signing policy can be implemented in specific scenarios. Other scenarios should be recognized by the skilled artisan.

FIG. 3 illustrates a document 300 which includes a package relationship part 301, a document sequence part 302 and an associated document sequence (DS) relationship part 303, and at least one fixed document part. Individual fixed document parts are associated with individual fixed document (FD) relationship parts. In this example, three fixed document parts 304, 306, and 308 are illustrated, but other examples could have any number of fixed document parts. Due to the physical constraints of the paper on which FIG. 3 appears a FD relationship part 309 is only illustrated for fixed document part 304.

Package relationship 301 is a relationship whose target is a part and whose source is a package as a whole. Document sequence part 302 contains markup that references the fixed document parts 304, 306, and 308. Stated another way, the document sequence is a part that lists what fixed documents are contained in document 300. Any deletion of one or more of fixed document parts 304, 306, or 308 is reflected in document sequence part 302. Similarly, any addition of a new fixed document part is reflected in the document sequence part.

Individual fixed document parts reference fixed page parts. Stated another way, fixed document parts contain a list of their respective fixed pages. Due to space constraints of the physical page upon which FIG. 3 appears fixed page parts are only illustrated in relationship to fixed document part 304. In this instance, two fixed page parts 310, 312 are illustrated, but any number of fixed page parts could be referenced by an individual fixed document part. Any deletion or addition of a fixed page part is reflected in the associated fixed document part.

An individual fixed page part is linked to its resource part(s) through a relationship part which specifies all of the resources to which an individual page is linked. For instance, fixed page part 310 is associated through fixed page (FP) relationship part 320 to resource parts 322, 324. Due to the physical limitations of the drawing page the relationship parts and resource parts are not illustrated in relation to fixed page part 312. Any deletion or addition of content from a fixed page part is reflected in the fixed page part and/or in the associated relationship part. Further still, any changes to a given resource are reflected in that resource.

The digital signing policy serves to establish the configuration or content of document 300 at the time that the digital signature is applied. In this particular example, the digital signing policy specifies that the digital signature must encompass the package relationship part 301, the document sequence part 302, the fixed document parts 304, 306, and 308, the fixed page parts 310, 312, the resource parts 322, 324 and the associated relationship parts 303, 309 and 320. The digital signing policy rules provides a mechanism to ensure that a document which stores data as plurality of logical parts is maintained in a configuration which was digitally signed by a user. In an instance where the document is stored as logical parts, the document configuration is established from the interrelationships of the parts as well as the data within the parts. As such, the digital signing policy serves to establish both the part inter-relationships and the intra-part data. In an instance where the document configuration is altered by altering either or both the part inter-relationships and the intra-part data, the digital signing policy causes the digital signature to be invalidated. Such a digital signing policy mechanism allows the author or a subsequent user to determine whether the document remains consistent with the configuration associated with the digital signature.

For purposes of explanation, assume that document 300 is digitally signed in compliance with the digital signing policy specified above by a publishing user such that the digital signature encompasses the package relationship part 301, the document sequence part 302 as well as its document sequence relationship part 303, the fixed document parts 304, 306, and 308 and their respective fixed document relationship parts (only FD relationship part 309 is specifically designated), the fixed page parts 310, 312, and the fixed page relationship part 320 and the resource parts 322, 324. In such an instance the document configuration which is represented for the publishing user at the time of signing is effectively encompassed by the signed parts specified by the digital signing policy. Assume further that a subsequent user attempts to add a new fixed document to document 300. The new document will be represented in the document sequence part 302. This change to the document sequence part will cause the publishing user's digital signature to be invalidated consistent with the digital signing policy. In this particular implementation, the fact that the digital signature is invalidated may be visually represented in a manner which is easily noticed by the users. Other implementations may provide a warning to the user that the action that they are about to perform will invalidate the document's digital signature. However, in this implementation, the digital signing policy does not prevent the consuming user from adding the new document and invalidating the digital signature. Rather, such an action simply invalidates the digital signature and the system confers this information to a user to act as they see fit. For instance if a consuming user receives a document with an invalidated signature of the publishing user, the consuming user may treat the document as having been tampered with and request a new signed document from publishing user.

In a similar vane to the above example consider a scenario where a subsequent user attempts to remove a resource referenced by a particular fixed page part and replace the resource with a different resource. For instance, the resource may be an image which the user attempts to replace with a second different image. Such an action causes the publishing user's digital signature to be invalidated because the action attempts to alter (in this instance delete a signed part of the document). In this example invalidating the digital signature responsive to changing a referenced image is consistent with the function of the digital signing policy. Assume for purposes of example, that document 300 is an offer by a builder to build a house for a given price. Further assume that the referenced image is a blueprint of the house included in the offer. The price of the offer is premised on that particular blueprint. As such the builder does not want someone, such as the property owner, to be able to substitute a different blueprint such that it appears that the builder made the offer based upon the substituted blueprint. The digital signing policy functions to notify the builder and/or the property owner that the offer remains in the configuration signed by the builder in the offer or that the offer has been altered such that it is no longer consistent with the configuration signed by the builder.

FIG. 4 illustrates another document 400 to which the digital signing policy specifies which document parts are to be encompassed by a digital signature for the document to be considered signed. If the document is digitally signed in compliance with the digital signing policy the digital signature captures the configuration of the document at the time it was digitally signed. Stated another way, in this implementation, the digital signature policy specifies which portions of a package must not change in order for the content to be considered intact. To ensure validity, some client applications and/or their users may require that all of the parts and relationships in a package be signed and validated. Others may require that only selected parts or relationships be signed and validated to indicate that the content has not changed. The digital signature policy provides flexibility in defining the content that will be signed while allowing parts of the package to remain changeable. Document 400 provides an example for scenarios where a signing user may specify instances where specific content of the document can be changed without breaking the user's digital signature.

Document 400 includes a package relationship part 402, a digital signature definitions part 404 and a core properties part 406. In this instance, the digital signature definitions part, the core properties part and the package relationship part are defined at a package level and as such are inherited at the document level and are maintained by the digital signing policy. Package relationship 402 is a relationship whose target is a part and whose source is a package as a whole. The digital signature definitions part 404 allows a publishing user to define a requested set of people to digitally sign the document and the conditions or definitions associated with each requested digital signature. The core properties part relates to one or more properties which a user can define in the document. For instance one such core property may be 'document author' which the user is free to designate with whatever name or pseudonym they desire.

Document 400 further includes a document sequence part 410 with an associated document sequence (DS) relationship part 412, and a fixed document part 414 with an associated fixed document (FD) relationship part 416. The fixed document part 414 references a fixed page part 418 and an annotations part 420. The fixed page part 418, as indicated in a fixed page (FP) relationship part 422, is linked to resource part 424. This particular implementation also includes a thumbnail part 426 which will be discussed in more detail below.

The digital signing policy functions to establish the content of document 400 at the time that the digital signature is applied. In this implementation, the digital signing policy specifies that for the document to be in compliance with the digital signing policy that the digital signature encompass the package relationship part 402, the document sequence part 410 and its DS relationship part 412, the fixed document part 414 and its FD relationship part 416, the fixed page part 418 and its FP relationship part 422 as well as the resource part 424. The digital signing policy further states that the digital signature encompasses thumbnail 426 when present. Of course while only a single example of each of the above parts is illustrated many implementations will have multiple instances of parts 414-426.

In this instance, signing the package relationship 402 prevents a subsequent user from changing the package relationship without invalidating the signing user's digital signature. Similarly, signing the document sequence part 410 and its DS relationship part 412 prevents removal of existing fixed document or addition of new fixed documents without invalidating the digital signature. Signing the fixed document part 414 and its FD relationship part 416 prevents changes to the order of pages in a fixed document or addition or deletion of fixed pages. Signing the fixed page part 418 and its FP relationship part 422 serves to prevent content of a page from being changed. Signing resource part 424 prevents removal or substitution of the resource part. Similarly, signing the thumbnail part when present, such as in this illustrated implementation prevents substitution or deletion of the thumbnail 426 without breaking the signature. Likewise, if the digital signature definitions part 404 is present, such as indicated here, the digital signing policy encompasses the digital signature definitions part with the digital signature. The digital signing policy functionally signs each of these components to collectively provide an indication as to whether the document has been altered from the signed configuration.

In this implementation, the digital signing policy allows the signing user to decide whether content of specific parts of the document can be manipulated without invalidating the signing user's digital signature. For example, does the signing user want a subsequent user to be able to add content to the document without invalidating the signing user's digital signature? In one such instance, the signing user can decide whether to allow a subsequent user to add digital signatures to the document. In another instance, the signing user can decide whether to allow a subsequent user to change core properties to the document. In still another instance, the signing user can decide whether to allow a subsequent user to add annotations to the document. Each of these options is independent of the others and the signing user can allow none of the optional additions to the document or any desired combination.

Figure 5:
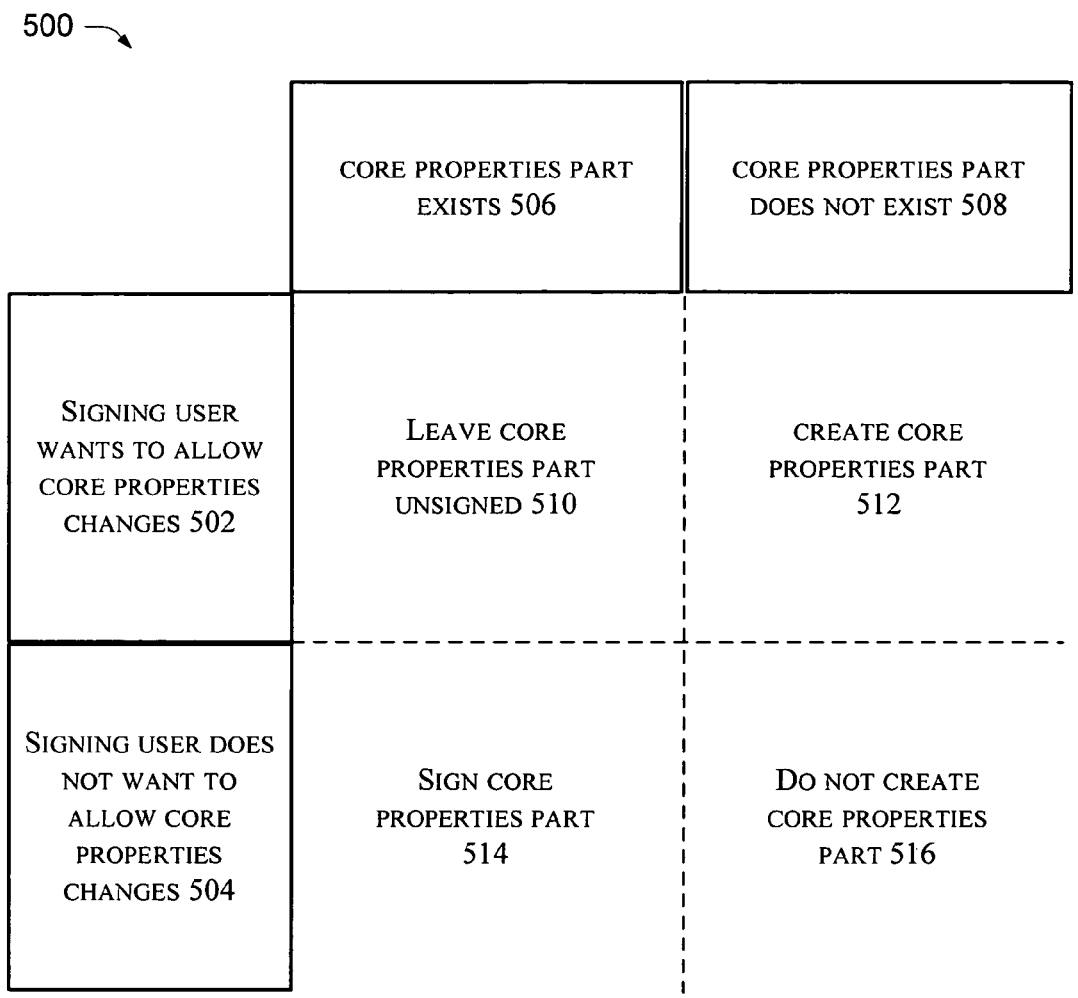

FIG. 5 illustrates one example of digital signing policy in the form of a logic table 500 relating to core properties. Logic table 500 relates to two mutually exclusive scenarios. In the first scenario the signing user wants to allow core properties changes as indicated at 502. In the second scenario the signing user does not want to allow core properties changes as indicated at 504. In relation to the two scenarios 502, 504 one of two situations exists. Either the core properties part exists as indicated at 506, or the core properties part does not exist as indicated at 508.

As indicated at 510, in an instance where the signing user wants to allow core properties changes and a core properties part exists, then the digital signing policy leaves the core properties part unsigned when the user digitally signs the document but the policy applies the user's digital signature to the package relationship described in relation to FIG. 4. The package relationship contains a link to the core properties part so a subsequent user can change the core properties without invalidating the user's signature.

As indicated at 512, in an instance where the signing user wants to allow core properties changes and the core properties part does not exist then the digital signing policy creates a core properties part before the user digitally signs the document. The core properties part may be empty at this point, but creating it before signing allows content to be added subsequently. The core properties part is then left unsigned so that subsequent changes can be made to the core properties. As above, the user's digital signature is applied to the package relationship to prevent material from being changed or deleted.

As indicated at 514, if the signing user does not want to allow core properties additions and a core properties part exists, then the digital signing policy signs the core properties part with the user's digital signature as well as the package relationship. In such a scenario the user's digital signature encompasses the core properties part such that any changes to the core properties part invalidates the user's signature.

Finally, as indicated at 516, if the signing user does not want to allow core properties additions and a core properties part does not exist then the digital signing policy does not create a core properties part prior to the user digitally signing the document. As with the other scenarios the digital signature is applied to the package relationship. In this a scenario, subsequently adding core properties necessitates adding a core properties part. Adding a core properties part changes the package relationship part which invalidates the user's signature.

Referring collectively to FIGS. 4-5, the digital signing policy can handle annotations in a manner similar to that described above in relation to core properties. Annotations are added to an annotations part 420 which is referenced by fixed document part 414. If the annotations part is encompassed by the user's digital signature adding annotations will invalidate the signature. If an annotation part does not exist, creating the part after the digital signature is applied will change the fixed document part and invalidate the signature. If the signing user wants to allow annotations to be added then an annotations part should exist at the time of signing and should be left unsigned. The annotations part may be created before digitally signing the document. In such instance, the newly created annotations part may be empty at the time the user's digital signature is applied.

Figure 6:
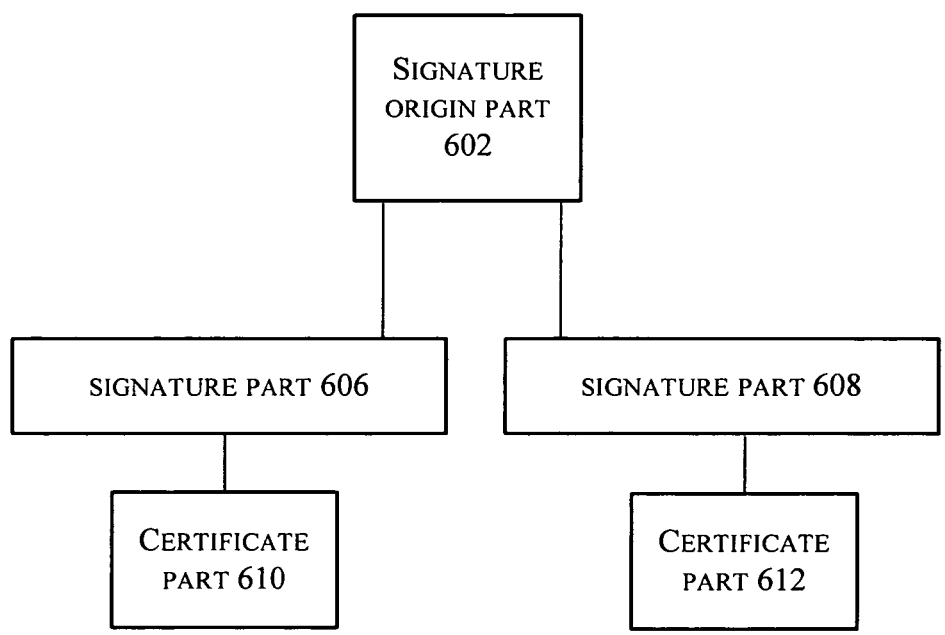

FIG. 6 relates to digital signature parts such as can be associated with document 400 represented in FIG. 4. In this implementation, the digital signature parts include a signature origin part 602, signature parts, and certificate parts. In this instance two signature parts 604, 606 are represented as well as two certificate parts 608, 610. The present implementation manifests certificate parts 608, 610 as separate and distinct parts. In other implementations the certificate parts may be embedded within the associated signature part. The signature origin part 602 provides a starting point for navigating the available digital signatures of a document. A signature part, such as 606 or 608, which contains a digital signature that encompasses the parts specified by the digital signing policy and which is properly verified, can be considered valid. For example, the system verifies that the correct parts are signed in accordance with the digital signing policy. The system further verifies the state of optionally signed parts, such as core properties described above, and how a condition of the optionally signed parts affects the user. The system also verifies that for signed parts that the signature is valid. For instance, the system checks whether the hash computation matches as should be recognized by the skilled artisan.

Stated another way if the signature part encompasses the document parts consistent with the digital signing policy and the signature verification is successful then the document can be considered as a valid signed document, such as an XPS document. In such an instance a user can consider that such a document has the same configuration as existed at the time the valid digital signature was applied.

The digital signing policy provides a flexible solution regarding whether additional material can be added to the document. The solution allows the publishing user to specify what, if any, optional material can be added without invalidating their digital signature. The digital signing policy then factors in the present configuration of the document and acts accordingly to create or sign parts as described above in FIGS. 4-6. At least some implementations are analogous to switches. For instance, if the author switches signature protection on and someone adds a digital signature the digital signing policy breaks the author's digital signature. If the author does not want signature protection, someone can add a digital signature without affecting the author's digital signature. The same principle is applied to other optional additions such as annotations and core properties. So the solution is very flexible in that it lets the signing user define a policy parameter and the digital signing policy acts accordingly to enable subsequent user's to add the content without breaking the signing user's digital signature. However, despite its flexibility, the digital signing policy continues to prevent anyone from altering the document's configuration without breaking the consuming user's digital signature. At an end-user level the described digital signing policy provides increased confidence that a document bearing a user's digital signature remains consistent with the configuration digitally signed by the user. The digital signing policy is also useful for establishing a digital signing policy which can be complied with, and/or understood by, other software products which may interact with digital signing policy compliant documents and document formats. The digital signing policy define standards for what is actually encompassed by a signed document, how to generate a digital signing policy compliant signed document, and/or how to evaluate a received document to determine if the document's digital signature is valid. In summary, the digital signing policy defines what a digitally signed document actually means.

Exemplary Computing Environment

Figure 7:
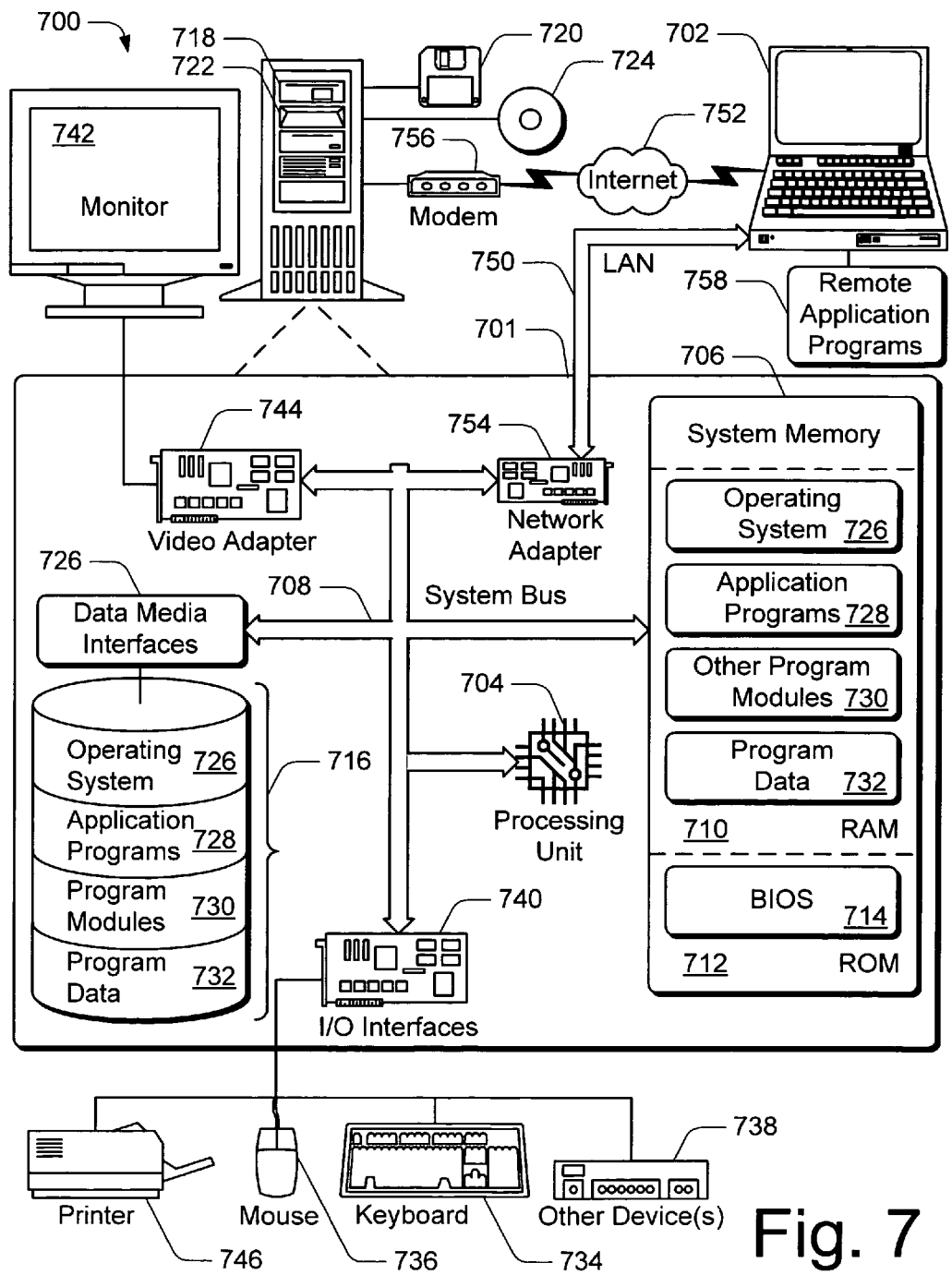
FIG. 7 illustrates exemplary systems, devices, and components in an environment upon which digital signing policy can be embodied in accordance with one implementation.

FIG. 7 represents an exemplary system or computing environment 700 upon which digital signing policy may be implemented. System 700 includes a general-purpose computing system in the form of a first machine 701 and a second machine 702.

The components of first machine 701 can include, but are not limited to, one or more processors 704 (e.g., any of microprocessors, controllers, and the like), a system memory 706, and a system bus 708 that couples the various system components. The one or more processors 704 process various computer executable instructions to control the operation of first machine 701 and to communicate with other electronic and computing devices. The system bus 708 represents any number of several types of bus structures, including a memory bus or memory controller, a peripheral bus, an accelerated graphics port, and a processor or local bus using any of a variety of bus architectures.

System 700 includes a variety of computer readable media which can be any media that is accessible by first machine 701 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714 maintains the basic routines that facilitate information transfer between components within first machine 701, such as during start-up, and is stored in ROM 712. RAM 710 typically contains data and/or program modules that are immediately accessible to and/or presently operated on by one or more of the processors 704.

First machine 701 may include other removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for first machine 701.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, application programs 728, other program modules 730, and program data 732 (or some combination thereof) may include an embodiment of the systems and methods described herein.

A user can interface with first machine 701 via any number of different input devices such as a keyboard 734 and pointing device 736 (e.g., a "mouse"). Other input devices 738 (not shown specifically) may include a microphone, joystick, game pad, controller, satellite dish, serial port, scanner, and/or the like. These and other input devices are connected to the processors 704 via input/output interfaces 740 that are coupled to the system bus 708, but may be connected by other interface and bus structures, such as a parallel port, game port, and/or a universal serial bus (USB).

A monitor 742 or other type of display device can be connected to the system bus 708 via an interface, such as a video adapter 744. In addition to the monitor 742, other output peripheral devices can include components such as speakers (not shown) and a printer 746 which can be connected to first machine 701 via the input/output interfaces 740.

First machine 701 can operate in a networked environment using logical connections to one or more remote computers, such as second machine 702. By way of example, the second machine 702 can be a personal computer, portable computer, a server, a router, a network computer, a peer device or other common network node, and the like. The second machine 702 is illustrated as a portable computer that can include many or all of the elements and features described herein relative to first machine 701.

Logical connections between first machine 701 and the second machine 702 are depicted as a local area network (LAN) 750 and a general wide area network (WAN) 752. Such networking environments are commonplace in offices, enterprise-wide computer networks, intranets, and the Internet. When implemented in a LAN networking environment, the first machine 701 is connected to a local network 750 via a network interface or adapter 754. When implemented in a WAN networking environment, the first machine 701 typically includes a modem 756 or other means for establishing communications over the wide area network 752. The modem 756, which can be internal or external to first machine 701, can be connected to the system bus 708 via the input/output interfaces 740 or other appropriate mechanisms. The illustrated network connections are exemplary and other means of establishing communication link(s) between the first and second machines 701, 702 can be utilized.

In a networked environment, such as that illustrated with System 700, program modules depicted relative to the first machine 701, or portions thereof, may be stored in a remote memory storage device. By way of example, remote application programs 758 are maintained with a memory device of second machine 702. For purposes of illustration, application programs and other executable program components, such as the operating system 726, are illustrated herein as discrete blocks, although it is recognized that such programs and components reside at various times in different storage components of the first machine 701, and are executed by the processors 704 of the first machine.

Exemplary Processes

Figure 8:
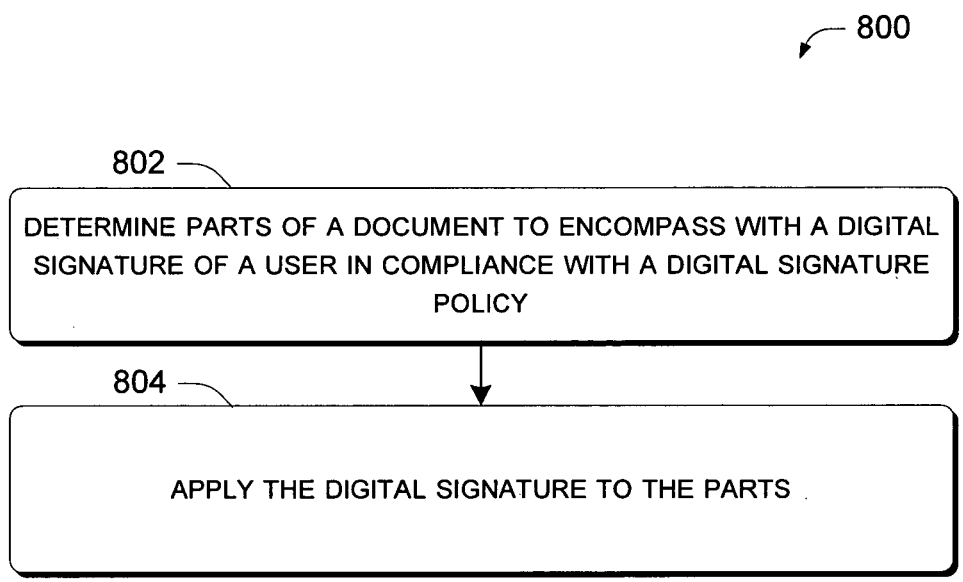
FIG. 8 illustrates an exemplary process diagram relating to digital signing policy in accordance with one implementation.

FIG. 8 illustrates an exemplary process 800 related to digital signing policy. The order in which the process is described is not intended to be construed as a limitation, and any number of the described process blocks can be combined in any order to implement the process. Furthermore, the process can be implemented in any suitable hardware, software, firmware, or combination thereof.

At block 802 the process determines parts of a document to encompass with a digital signature of a user in compliance with a digital signing policy. In some implementations, digital signing policy can specify that all parts of the document be digitally signed. In other implementations the digital signing policy can specify a sub-set of the parts to be digitally signed.

For instance in one implementation the digital signing policy is applied to parts which contribute to a document configuration as represented at the time of signing. In such an instance, the digital signing policy functions to notify the user and/or other users whether the document has been altered subsequent to signing in such a way as to change the document configuration from the document configuration which the user signed.

At block 804 the process applies the digital signature to the parts determined at block 802. The user's digital signature is effectively applied to all the parts specified by the digital signing policy such that if any of the parts are altered the digital signature is broken or invalidated. Breaking the digital signature relative to any of the parts breaks the digital signature for the document as whole. The underlying rationale being that altering any of the specified parts may change the document configuration.

The process can represent whether the digital signature remains valid or not so that the user and/or subsequent users can make more informed decisions as to how to treat the document. The digital signing policy effectively creates an environment with a higher degree of certainty for the user. For example, if a publishing user is happy with a particular document configuration and digitally signs the document, the digital signing policy ensures that as long as his/her digital signature remains valid both the publishing user and any consuming user can act with confidence that they are viewing the document configuration that was digitally signed by the publishing user. This can be especially valuable in a scenario where the publishing user digitally signs a desired document configuration and then sends the document to an adverse consuming party such as may be encountered in contract negotiations. If the consuming user then sends the document back to the publishing user, the publishing user may be very leery that the consuming party made some difficult to detect but important change to the document. The digital signing policy functionality allows the publishing user to easily determine if the returned document has the same configuration which he digitally signed. Since the digital signing policy creates a higher level of certainty for the users, it may foster a higher level of acceptance of digital documents, especially in matters considered important by the users. Further, when viewed from a system perspective, the digital signing policy promotes interoperability between software products which may interact with or support digital signing policy compliant documents.

Although implementations relating to digital signing policy have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-implemented method, comprising:
   storing a document as discrete parts in electronic form on a computing device, the document including a document configuration that conveys data related to content of at least one discrete part and a document sequence portion that lists the discrete parts;
   applying a digital signature to the document stored on the computing device based on a digital signing policy to protect the content of the at least one discrete part with the digital signature while leaving the document sequence portion that lists the discrete parts unprotected by the digital signature;
   invalidating the digital signature when the content in the at least one discrete part is altered; and
   indicating that the digital signature is valid when the document sequence portion is altered to list an additional discrete part that is added to the document.

2. The computer-implemented method as recited in claim 1, wherein the document stored comprises an XPS document format.

3. The computer-implemented method as recited in claim 1, wherein the digital signing policy prevents an additional digital signature for protecting the document from being applied to the document.

4. The computer-implemented method as recited in claim 1, further comprising providing a warning that the document sequence portion is about to be altered by the addition or the deletion of the one or more discrete parts.

5. The computer-implemented method as recited in claim 1, further comprising providing an invalidation indication via an interface when the digital signature is invalidated.

6. The computer-implemented method as recited in claim 1, further comprising indicating that the digital signature is invalid when the data in the at least one discrete part is altered.

7. A computer-readable memory comprising computer-executable instructions that, when executed, perform acts, comprising:
   storing a document including a plurality of discrete parts and a document sequence portion that lists the plurality of discrete parts;
   protecting the document with a digital signature that is applied to the document based on a digital signing policy, the digital signing policy indicating that the document sequence portion is unprotected by the digital signature and the plurality of discrete parts are protected by the digital signature, the digital signing policy further preventing an additional digital signature for protecting the document from being added to the document;
   invalidating the digital signature when content of at least one discrete part is altered; and
   indicating that the digital signature is valid when the document sequence portion is altered to list an additional discrete part that is added to the document.

8. The computer-readable memory of claim 7, further comprising providing a warning when the discrete part is about to be altered.

9. The computer-readable memory of claim 7, further comprising verifying the digital signature.

10. The computer-readable memory of claim 7, further comprising providing a warning when the document sequence portion included in the document is about to be altered by an addition of the discrete part to the document or a deletion of an existing discrete part from the document.

11. The computer-readable memory of claim 7, further comprising indicating that the digital signature is valid when the content of the at least one discrete part is altered.

12. The computer-readable memory of claim 7, further comprising indicating that the digital signature is invalid when data is removed from the at least one discrete part.

13. The computer-readable memory of claim 7, further comprising providing an invalidation indication via an interface when the digital signature is invalidated.

14. The computer-readable media of claim 7, wherein the digital signing policy further prevents an addition of an annotation part to the document.

15. A system, comprising:
a processor:
a memory storing computer-executable instructions that are executable by the processor to perform acts comprising:
  storing a document as discrete parts, the document including a document configuration that conveys data related to content of one or more discrete parts and a document sequence portion that lists the one or more discrete parts;
  applying a digital signature to the document based on a digital signing policy, the digital signing policy indicating that the document sequence portion is unprotected by the digital signature and the one or more discrete parts are protected by the digital signature;
  invalidating the digital signature when the content of the one or more discrete parts is altered; and
  indicating that the digital signature is valid when the document sequence portion is altered to list an additional discrete part that is added to the document.

16. The system as recited in claim 15, further comprising computer-executable instructions that are executable by the processor to perform an act of providing an invalidation indication via an interface when the digital signature is invalidated.

17. The system as recited in claim 15, wherein the digital signing policy further defines a sub-set of a discrete part as protected such that the digital signature is invalidated when the sub-set of the discrete part is altered.

18. The system as recited in claim 17, wherein the digital signature is applied to each discrete part of the sub-set based on the digital signing policy such that altering the discrete part invalidates the digital signature.

19. The system as recited in claim 15, wherein the digital signing policy prevents an additional digital signature for protecting the document from being applied to the document.

* * * * *